United States Patent [19]
Nanai

[11] Patent Number: 4,797,689
[45] Date of Patent: Jan. 10, 1989

[54] ULTRASONIC VIBRATION DRIVING TYPE THERMAL PRINTER

[75] Inventor: Sadaaki Nanai, Saitama, Japan

[73] Assignee: Eastman Kodak Company, Rochester, N.Y.

[21] Appl. No.: 138,626

[22] Filed: Dec. 28, 1987

[30] Foreign Application Priority Data

May 25, 1987 [JP] Japan ................................ 62-127324

[51] Int. Cl.⁴ ............................................ G01D 15/10
[52] U.S. Cl. ............................... 346/76 PH; 400/120; 400/617
[58] Field of Search ................. 400/120, 617; 346/1.1, 346/76 PH

[56] References Cited

U.S. PATENT DOCUMENTS

| | | | |
|---|---|---|---|
| 4,562,374 | 12/1985 | Sashida | 310/323 |
| 4,678,956 | 7/1987 | Izukawa et al. | 310/323 |
| 4,692,649 | 9/1987 | Izukawa et al. | 310/316 |
| 4,692,650 | 9/1987 | Okumura et al. | 310/323 |
| 4,692,651 | 9/1987 | Hiramatsu et al. | 310/323 |
| 4,692,672 | 9/1987 | Okuno | 318/116 |

FOREIGN PATENT DOCUMENTS 0096466 of 1985 Japan .
0253573 of 1985 Japan .

Primary Examiner—E. A. Goldberg
Assistant Examiner—Huan H. Tran
Attorney, Agent, or Firm—Raymond L. Owens

[57] ABSTRACT

A thermal printer in which dye is transferred from a film to a receiver in response to heat including a thermal head assembly having a plurality of heating elements. The thermal head comprises a vibration device adapted to induce a vibration wave in the heating elements which move in one direction in time. The heating elements are supported by the vibration device and, as they frictionally engage the film, cause the film and the receiver to move in the opposite direction.

2 Claims, 2 Drawing Sheets

ULTRASONIC VIBRATION DRIVING TYPE THERMAL PRINTER

TECHNICAL FIELD OF THE INVENTION

The present invention relates to a thermal printer in which heating elements are formed on a vibration device such as an ultrasonic vibrator which sets up a vibration wave that directly drives a color dye film and an image receiver.

DESCRIPTION OF THE PRIOR ART

Referring now to FIG. 1, there is shown a printing section of a conventional thermal printer. FIGS. 2a and 2b in combination show one example of the structure of a thermal head illustrated in FIG. 1. In these figures, the thermal head includes a multiplicity of heating elements 2 formed on the underside of a substrate 1 composed of ceramic or the like, and conductive leads 3. These leads conduct direct current to the heating element causing such heating elements 2 to produce heat. A media unit 4 consisting of a color dye film 4a and an image receiver 4b moves as a platen roller 5 rotates while being in contact with the heating elements 2 of the thermal head TH.

The heating elements 2 are selectively energized and current flows through a desired conductive leads 3, thereby causing heat to be delivered to the film 4a. As a result, the color dye in the film 4a sublimates and transferred to the image receiver 4b. At the same time, the media unit 4 is moved with respect to the thermal head by TH the rotating action of the platen roller 5.

In the above-described conventional thermal printer, the media unit 4 and the platen 5 are moved in such a way that the thermal head TH remains stationary, so a slide condition always exists between the upper surface of the film 4a and the heating elements 2.

On the other hand, in order to obtain a high-quality print, it is necessary for the heat produced by the heating elements 2 to be propagated through the film 4a to the image receiver with high efficiency, uniformity and constant stability. Accordingly, the thermal head TH has to apply high pressure to the media unit 4 and the platen roller 5. It is not an easy thing, however, to maintain the sliding condition of the media unit 4 with respect to the thermal head assembly TH under such high pressure.

Special materials are coated on the upper layer of the film, in contact with, the thermal heat to maintain the favorable non-sticking condition between the media unit. These materials also must have desired heat transmission properties. It is difficult, provide slipping layers which have both of these properties. Furthermore, in some cases, the coating materials peel off the film and adhered to the image receiver.

SUMMARY OF THE INVENTION

Accordingly, it is a primary object of the present invention to obviate the above-described defects and to provide a thermal printer in which the media unit moves without undergoing any sliding action with respect to the thermal head during printing to thereby obtain favorable print quality.

To accomplish the aforementioned object, a thermal printer according to the present invention comprises vibration device adapted to induce a traveling vibration wave in the heating elements. The vibration wave travels or moves in one direction in time. The heating elements are supported by the vibration device, and, as they frictionally engage the film, causes the film and receiver to move in a predetermined direction.

When causing the vibration device to generate the traveling wave which moves in one direction in time, the moving members, that is, the film, image receiver and platen, which is brought into contact with the vibration device, move in a direction opposite to the direction of the traveling of the synthesized wave by means of the propelling force imposed by the heating elements.

DESCRIPTION OF THE PREFERRED EMBODIMENTS

Embodiments of the present invention will hereinafter be described with reference to FIGS. 3 to 6.

Figure 1:
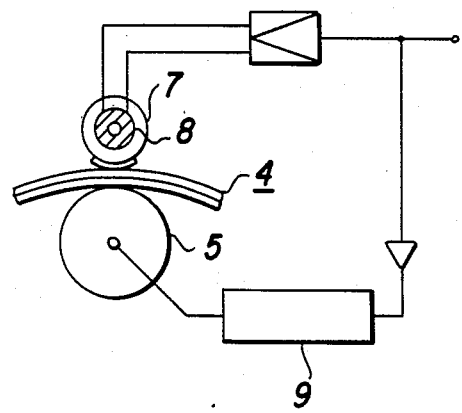
FIG. 1 shows one examle of a thermal head assembly of a conventional thermal printer.
Figure 2A:
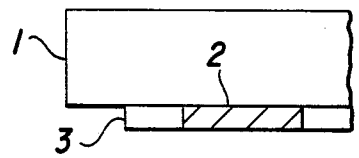
FIG. 2a is a sectional view of the thermal head.
Figure 2B:
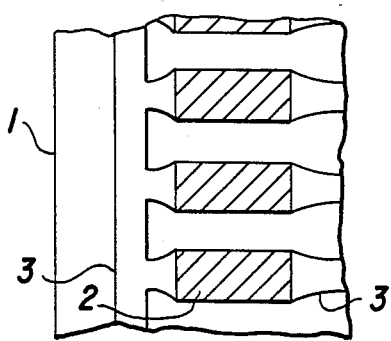
FIG. 2b is a plan view of a thermal head of FIG. 1.
Figure 3:
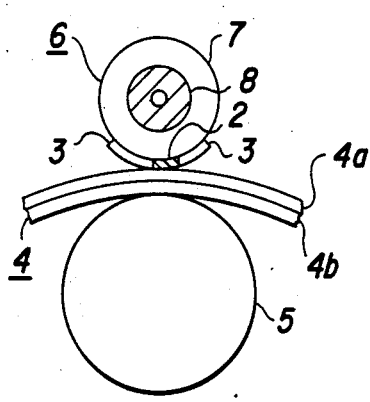
FIG. 3 is a schematic showing the first embodiment of a thermal printer according to the present invention.

FIG. 3 is a schematic showing the first embodiment of a thermal printer according to the present invention. Like components are designated with the same reference numerals as those in FIG. 1. In FIG. 3, the thermal head is equipped with a cylindrical vibration device 6 a multiplicity of heating elements 2 arranged in a row and the conductive leads 3 for conducting the electric current through the respective heating elements 2. The vibration device 6 comprises a cylindrical vibrator 8 composed of a piezo-electric material and a surrounding resilient member 7. The heating elements 2 and the conductive leads 3 are formed on the outer surface of the resilient member 7 so as to be in contact with the color dye film 4a. A traveling wave is induced in the heating elements 2.

Figure 4:
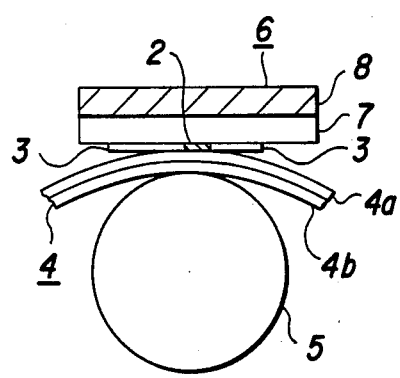
FIG. 4 is a schematic diagram showing the second emodiment of another thermal printer according to the present invention.

FIG. 4 shows the second embodiment of the present invention. The difference between the second embodiment and the first embodiment is that the vibration device comprises a resilient member 7 and a vibrator 8 formed of the piezo-electric material. On the lower surface of the resilient member 7 are a multiplicity of the heating elements 2 and the conductive leads 3. A traveling wave is induced in the heating elements.

In a traveling wave driving system which can be used in the present invention, a vibration wave moving in one direction in time is produced by a vibration device. The device includes a resilient member fixed to a vibrator made of the piezo-electric elements such as piezo-electric ceramic or the like. The moving member when it comes in facing-contact with the vibration member is forced to move. Traveling wave systems are well known. For a more complete disclosure of such systems and their components, see U.S. Pat. Nos. 4,562,374, 4,678,956, 4,692,649, 4,692,650 4,693,651, and 4,692,672.

In the above-described two embodiments (FIGS. 3 and 4), the vibration device 6 of the thermal head is adapted to generate the traveling wave; the media unit 4 and the platen 5 which are brought into facing-contact with the vibration member 6 are forced to move; as a result, separate driving forces are not imposed to the platen 5. However, if the film 4a is soft, the heating elements 2 dig into the film, and sometimes the heating elements 2 penetrate the film 4a, whereby the driving force is not sufficiently transmitted to the moving member. As one of the methods for solving this problem, it is helpful that the platen 5 be simultaneously rotated by driving means of any type together with the media unit 4.

Figure 5:
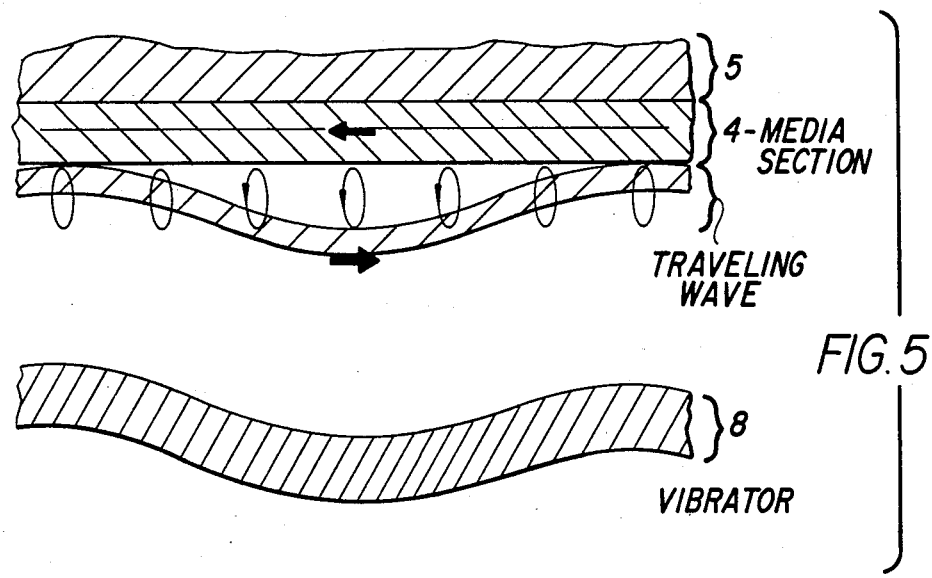
FIG. 5 is a diagram for explaining the operation of the embodiments of FIGS. 3 and 4.

This traveling wave driving system which induces a traveling wave in the heating elements 2 will not be explained in connection with FIG. 6. The vibrator 8 composed of the piezo-electric material and the resilient member 7 formed on the outer surface thereof are combined to constitute the vibration device 6. The heating elements 2 and the conductive lead 3, which are formed on the outer surface of the resilient member 7, are arranged such as to come in contact with the moving member, viz., the media unit 4 and the platen 5. With this arrangement, as is well known (see the above-cited U.S. patents) when the moving waves which travels in one direction is excited on the vibration member 6, each point of the surface of the vibration device 6 decribes a locus of points forming an ellipse. FIG. 5 schematically shows this situation. In FIG. 5, since the elliptical locus rotates in the anticlockwise direction, the moving member—the media unit 4 and the platen 5—is forced to move in the direction indicated by arrow by the propelling force produced in the direction opposite to the direction of the travel of the synthesized wave.

Figure 6:
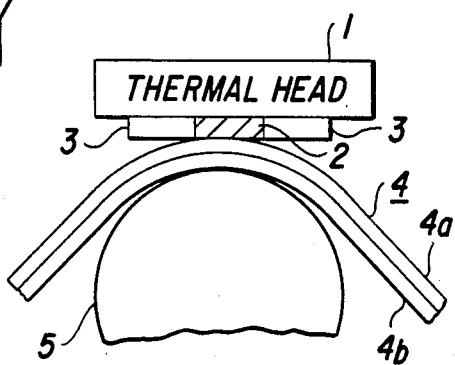
FIG. 6 is a schematic diagram showing a third embodiment of a thermal printer according to the present invention.

The driving means of FIG. 6 can be used with the FIG. 3 or FIG. 4 embodiments. In this figure, signals giving instructions of a driving velocity to the vibrator 8 are branched off and are then supplied to a motor 9 for rotating the platen 5. The motor 9 rotates to drive the platen roller 5 so that the platen rotates at the same velocity in the same direction as those of the media unit (film and receiver) 4 which is forced to move by the traveling wave produced by the vibration device 6. Accordingly, the relative velocity of the platen 5 to the media unit 4 becomes zero, and the driving forces from the thermal head to the moving member becomes zero or extremely small.

ADVANTAGES

According to the present invention, the media unit and the platen roller are rotated by the traveling vibration on wave excited in the vibration device, and hence it is possible to apply a large pressure to the thermal print head without creating problems noted above. Further, creases cannot be produced on the film. Moreover, the distance in which the ink film and the platen are moved for each image pixel becomes more uniform, so it is posible to obtain images having quality higher than that of the conventional thermal printers.

Because no sliding condition exists between the thermal head and the film, wear of the thermal head is also greatly be reduced.

The invention has been descirbed in detail with particular reference to a certain preferred embodiments thereof, but it will be understood that variations and modifications can be effected within the spirit and scope of the invention.

I claim:
1. In a thermal printer in which dye is transferred from a film to a receiver in response to heating including:
   a. a thermal head having a plurality of heating elements arranged in a predetermined configuration and selectively energized on the basis of print data;
   b. said heating elements being brought into frictional contact with the film having heat transferable color dye for causing the color dye to be transfered from the film to the receiver by means of the heat produced from the selectively energized heating elements; and
   c. a platen for supporting the film and the receiver,
      i. an improvement in the thermal head comprising:
      ii. a vibration device having an elastic member formed on said heating elements, said vibrating device including means for vibrating said elastic member which induces a vibration traveling wave in said heating elements; and
      iii. the induced vibration wave in said heating elements causes the film and receiver to move in a predetermind direction.

2. Thermal printer as claimed in claim 1 wherein said platen is a drum which is rotated by the film and receiver as they are driven in the predetermined direction.

* * * * *